E. P. HAFNER AND J. T. ROBERTS.
TIRE PEELING MACHINE.
APPLICATION FILED JULY 12, 1919.
1,329,239.
Patented Jan. 27, 1920.
2 SHEETS—SHEET 1.
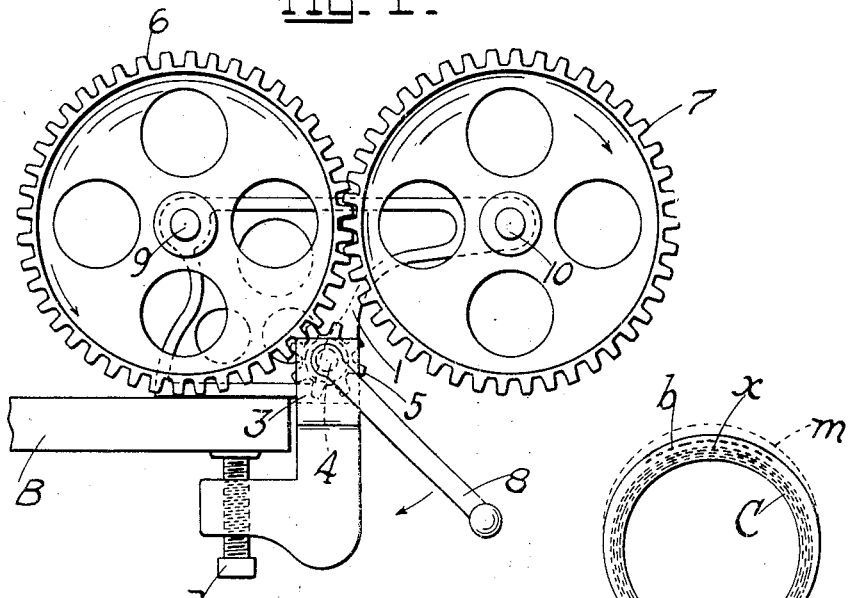
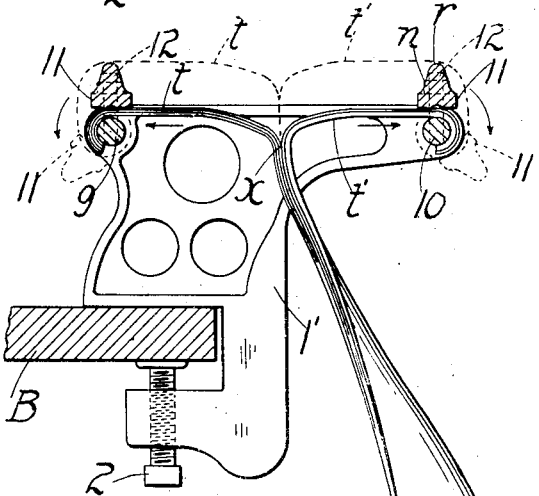
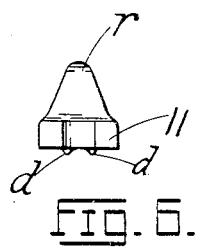
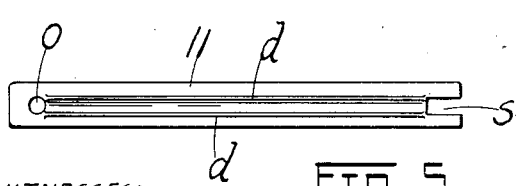
WITNESSES:
Harry A. Bennet
Elsa M. Siegel
INVENTORS.
Edward P. Hafner
John T. Roberts.
BY Emil Starek
ATTORNEY.

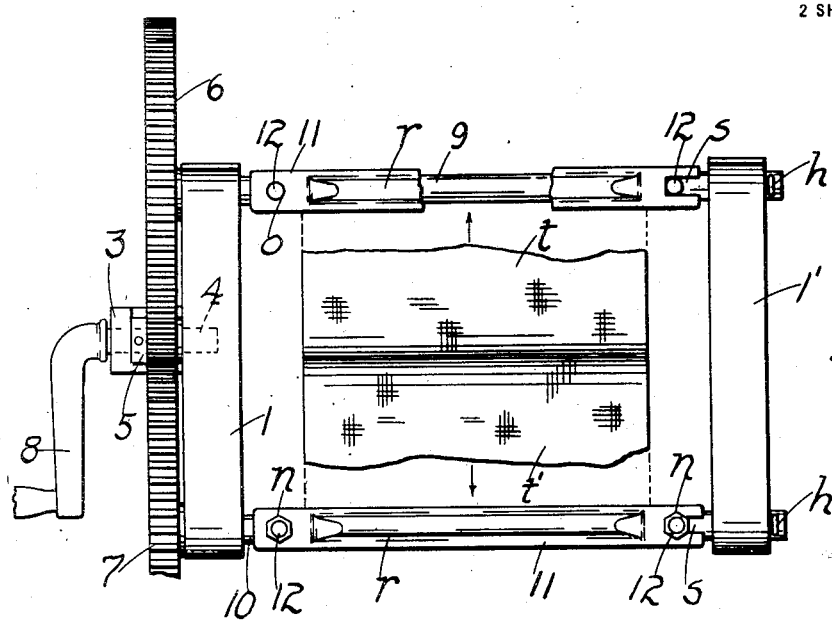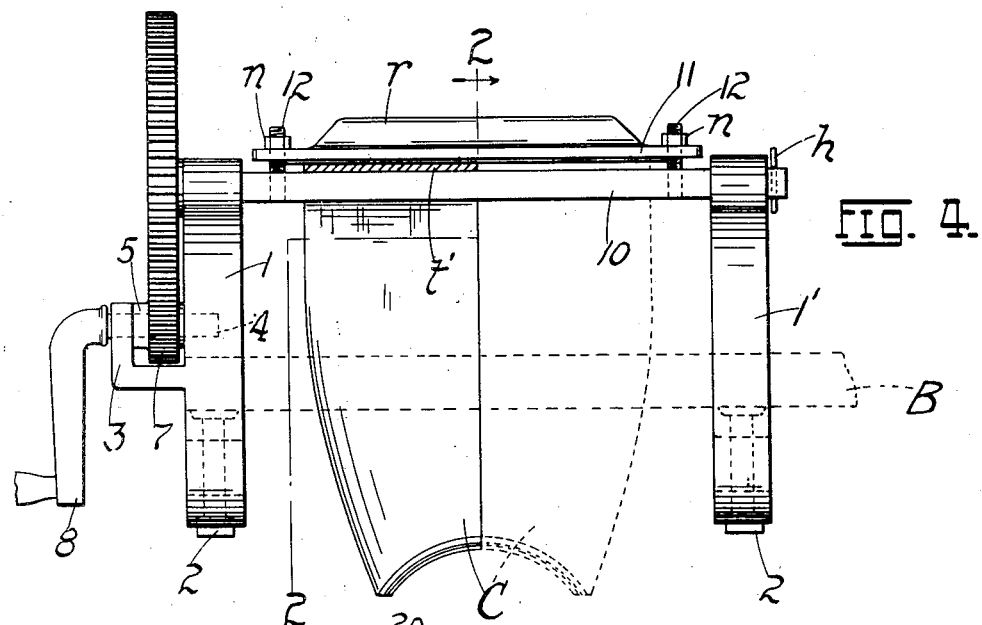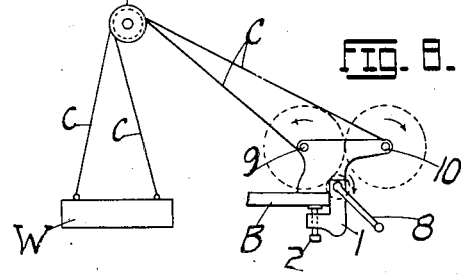

UNITED STATES PATENT OFFICE.

EDWARD P. HAFNER AND JOHN T. ROBERTS, OF ST. LOUIS, MISSOURI.

TIRE-PEELING MACHINE.

1,329,239.　　　　Specification of Letters Patent.　　Patented Jan. 27, 1920.

Application filed July 12, 1919. Serial No. 310,381.

*To all whom it may concern:*

Be it known that we, EDWARD P. HAFNER and JOHN T. ROBERTS, citizens of the United States, residing at St. Louis, State of Missouri, have invented certain new and useful Improvements in Tire-Peeling Machines, of which the following is a full, clear, and exact description, reference being had to the accompanying drawings, forming a part hereof.

The present invention is directed to improvements in tire-peeling machines, that is to say, machines which are employed in stripping the outer or tread layers of pneumatic tire-casings from the inner fabric layers, the latter being subsequently utilized as a foundation for a new tread or for any other industrial purpose, the worn tread portion stripped from the inner layers being usually discarded. The object of the invention is to provide a machine which may be hand-operated; one which is simple in construction and under ready control of the operator; one to which the tire casing to be peeled may be quickly applied and from which the parted layers may be quickly removed; and one possessing further and other advantages better apparent from the following detailed description in connection with the accompanying drawings in which—

Figure 1 represents a side elevation of the machine; Fig. 2 is a vertical cross-section on the zigzag line 2—2 of Fig. 4; Fig. 3 is a top plan; Fig. 4 is a front elevation of the machine; Fig. 5 is a bottom plan of the clamping strip detached; Fig. 6 is an end view of Fig. 5; Fig. 7 is a cross-section of a conventional tire casing; and Fig. 8 is a diagrammatic elevation showing another application of the invention.

Referring to the drawings, and for the present to Figs. 1 to 7 inclusive, B, represents a suitable bench or table to which the machine may be secured. The machine comprises a supporting frame composed of the side plates or standards 1, 1', respectively, the same being clamped or otherwise secured to the bench by the bolts 2 engaging the bottom of the bench as shown, or in any other suitable mechanical manner. The plate 1 is formed with an angle bracket 3 for the support of the shaft 4 of a pinion 5 which meshes with the teeth of a gear wheel 6 mounted on the plate 1, the gear 6 in turn meshing with a gear 7 likewise mounted on said plate. The shaft 4 of the pinion 5 is provided with an operating handle 8 where the machine is hand-driven or, as obvious, the shaft 4 may be coupled to a motor of any suitable type if desired. Leading from the gear wheel 6 and supported between the standards 1, 1', is a shaft 9; and leading from the gear wheel 7 and likewise supported between said standards and disposed parallel to and spaced from, and in the same horizontal plane with, the shaft 9 is a shaft 10, the free ends of the shafts projecting beyond the plate 1' being provided with cross-pins $h$ to insure retention of the shafts in their bearings. It will be observed that the plates 1 and 1' are disconnected permitting the plates to be separated any required distance depending on the lengths of the shafts 9 and 10, and on the width of the fabric or web to be wound on said shafts.

In practice, a casing C is peeled by first making a cross cut through the casing (Fig. 7), the operator separating the fabric layers $t$ from the tread layers $t'$ by hand substantially along the plane of separation indicated by $x$ or just inside the usual breaker strip $b$, the layers being initially parted for a few inches from the end of the casing, and their free ends clamped to the shafts 9 and 10 respectively. The preferred form of clamp is a strip or bar 11, the same being provided at the bottom with a pair of ribs $d$ so as to better engage or bite the fabric passed over the shafts 9 and 10, the bars being drawn tightly to the layers $t$, $t'$, and to the respective shafts 9, 10, by the nuts $n$ of the clamping bolts 12 projecting radially from the shafts and passed through the openings $o$ and fork-slots $s$ at the opposite ends of the clamping bars. The bars are formed with ridges $r$ on the side opposite the ribs $d$, the lengths of the ridges being substantially equal to the width of the web of fabric or rubber to be wound over the shafts 9 and 10 and their clamping bars, the shafts with their clamping bars forming jointly a bobbin over which are wound the parted inner fabric and outer tread layers $t$, $t'$, respectively. Ordinarily, the beads $w$ of the tire casing are first cut off before the peeling operation is begun. In Fig. 7, $m$ represents the original boundary of the tire casing, the tread portion having worn down close to the breaker strip $b$ as shown.

The operation is readily understood from Fig. 2. There it will be seen, that the terminals t, t', of the inner and outer layers respectively of the tire casing have been brought between the clamping strips 11 and their respective winding shafts 9 and 10. By turning the crank or handle 8 in the direction shown by the arrow in Fig. 1, the gears 6 and 7 and consequently the shafts 9 and 10 will rotate in opposite directions, causing the layers t, t', of the casing which is being peeled to wind on their respective shafts and clamp bars between which and the shafts the fabric is gripped; and as fast as the layers are wound they are parted, the one layer being stripped from the other along the plane (x) of original separation, and both layers continuing to wind on the shafts and clamp bars until the entire length of the tire casing or other sheet is peeled. It may be stated in passing that the casing C is flattened as much as possible preparatory to peeling so that the layers may peel off readily. Since the bars 11 are disposed to one side of the axes of rotation of the shafts 9, 10, to which they are secured, each shaft with its clamp bar will operate as a unit on the order of an eccentric or cam, said cam sweeping about the axis of the shaft and causing the wrappings to alternately approach and then recede from said axis as they wind first about the shaft and then about the clamp-bar portion of the aforesaid unit. This action causes the separating layers t, t', to rise and fall with the rotations of the shafts 9, 10. (Fig. 2). After the full length of tire casing has been peeled, the respective layers t, t', may be unwound by rotation of the shafts 9, 10, in the opposite direction, the tread layer t' being discarded and the fabric layer t used as a foundation for a new tread.

Obviously, the machine need not be limited in its application to peeling sheets of fabric. Thus, in Fig. 8 the machine is shown applied to the raising of a weight W. The latter is suspended by cables c passing over a pulley 20, the opposite ends of the cables being secured to the shafts 9 and 10. The winding of the cables on the shafts raises the weight W so that the machine may be utilized as a hoist.

Having described our invention what we claim is—

1. In a machine of the character described, a fixed support, two parallel rotatable members spaced apart, means for simultaneously imparting to said members rotations in opposite directions, and means for securing to said members the free ends of adhering layers of a sheet to be parted or peeled.

2. In a machine of the character described, a fixed support, two parallel shafts mounted thereon and spaced apart, means for imparting to the shafts simultaneous rotations in opposite directions, and means extending along the shafts for securing thereto the free ends of adhering layers of a sheet to be peeled or parted.

3. In a machine of the character described, a pair of standards fixed a suitable distance apart, two parallel shafts disposed substantially in a horizontal plane and spaced apart mounted between and supported by the standards, means adjacent to one of the standards for imparting to the shafts simultaneous rotations in opposite directions, clamping bars extending lengthwise of the shafts and formed respectively with longitudinal biting ribs and ridges on opposite sides of the bars, bolts on the shafts engaging the bars beyond the ends of the ridges for securing to the shafts the clamping bars aforesaid, the parts operating substantially as, and for the purpose set forth.

4. In a machine of the character described, a fixed support, two parallel rotatable members spaced apart, means for imparting to said members rotations in opposite directions, and means for securing to said members the ends of adhering layers of a sheet to be parted or peeled.

In testimony whereof we affix our signatures this 10th day of July, 1919, at St. Louis, Missouri.

EDWARD P. HAFNER.
JOHN T. ROBERTS.